J. GRÖNROOS.
ANTISKID DEVICE FOR AUTOMOBILES.
APPLICATION FILED NOV. 10, 1919.
1,351,750. Patented Sept. 7, 1920.
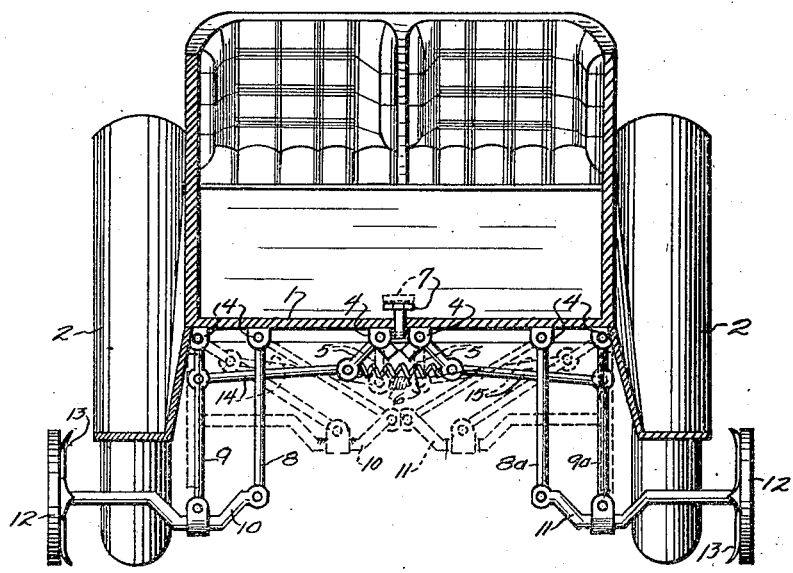
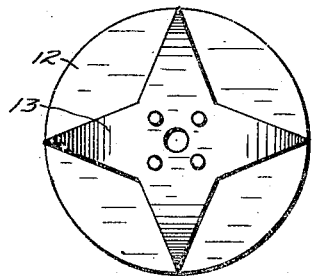
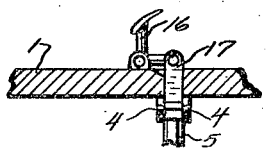

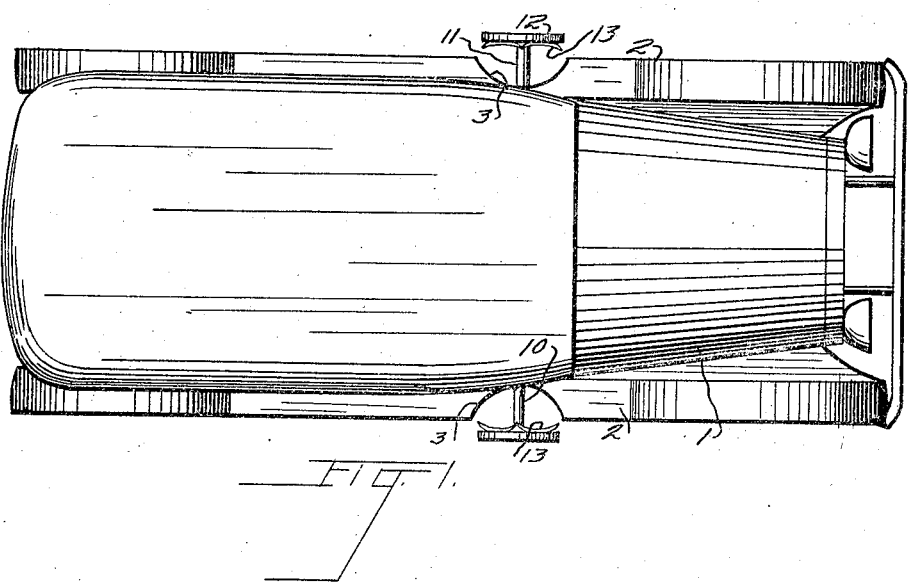
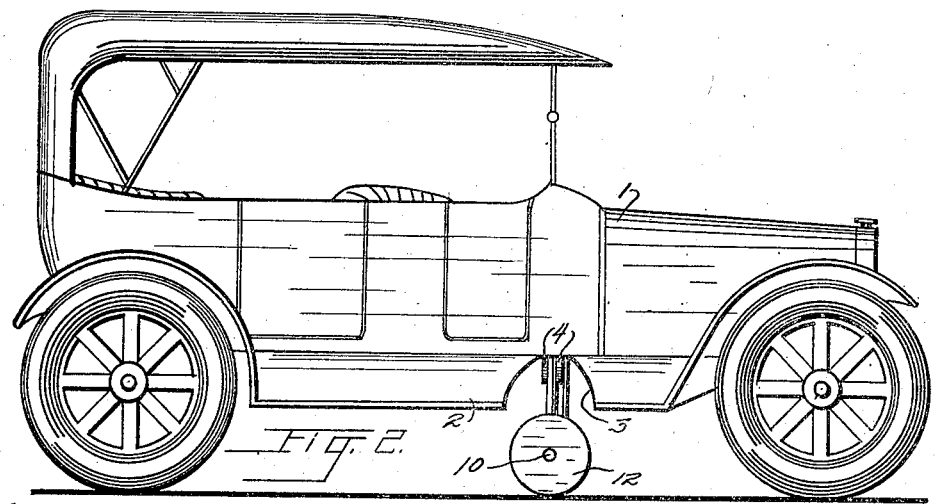

UNITED STATES PATENT OFFICE.

JAKOB GRÖNROOS, OF FAIRPORT HARBOR, OHIO.

ANTISKID DEVICE FOR AUTOMOBILES.

1,351,750. Specification of Letters Patent. Patented Sept. 7, 1920.

Application filed November 10, 1919. Serial No. 337,096.

*To all whom it may concern:*

Be it known that I, JAKOB GRÖNROOS, a citizen of Russia, residing at Fairport Harbor, in the county of Lake and State of Ohio, have invented certain new and useful Improvements in Antiskid Devices for Automobiles, of which the following is a specification.

This invention relates to improvements in anti-skid devices for automobiles and its object is to provide a device of this type that is simple in construction, cheap to manufacture and efficient in operation. With the foregoing and other objects in view the invention consists in the combination and arrangement of parts to be hereinafter fully described, pointed out in the appended claim and illustrated in the accompanying drawings which form a part of this specification and in which—

Figure 1 is a plan view of an automobile equipped with my invention.

Fig. 2 is a view of Fig. 1 in side elevation.

Fig. 3 is a cross section through the automobile showing the attachment in two positions.

Fig. 4 is an enlarged view of one disk employed.

Fig. 5 is a fragmentary view illustrating a modified form of foot lever that may be employed.

Like reference characters denote corresponding parts throughout the several views.

While two sets of my anti-skid device may be applied to an automobile I have illustrated but one set which under ordinary circumstances will be found efficient in operation. The reference numeral 1 denotes the automobile having the usual running board 2 which is to be formed with the recess 3 to afford clearance for the operation of my device. To the under surface of the floor of the automobile I secure a plurality of brackets 4 arranged in pairs. To one pair of brackets 4 the bell-cranks 5 are fulcrumed, each bell-crank comprising a longer and a shorter side as shown and the longer sides of said members being retained yieldingly in parallel relation by the connecting contractile spring 6, the shorter sides of said bell-cranks then abutting each other just below the lower end of the foot lever 7 which operates through a perforation in the car floor. To another set of brackets 4 a pair of rods 8, 9 are pivotally secured and to a third set of brackets 4 a pair of rods $8^a$, $9^a$ are pivotally secured, the rods 8, 9 pivotally supporting a crank shaft 10 and the rods $8^a$, $9^a$ pivotally supporting another crankshaft 11, each of said crank shafts being provided at its outer end with a disk 12 provided with a star-plate 13 the points of which plate are adapted for engagement with the road in the operative position of said disks. The rods 8, 9, $8^a$, $9^a$ are parallel with each other and consequently move in a common plane.

The rod 9 is connected by pitman 14 to one bell-crank 5 and the rod $9^a$ is connected by pitman 15 to another bell-crank 5. The normal position of my anti-skid mechanism is shown in dotted lines in Fig. 3 in which position the mechanism is yieldingly retained by the spring 6, the disk 12 then being disposed directly beneath the floor of the automobile in raised position. To move the mechanism into operative position, shown in Fig. 2 and in Fig. 3 in full lines, the operator depresses the foot lever 7 thus causing the bell-cranks to move the rods 8, $8^a$, 9, $9^a$ into vertical position thus moving the disks 12 outwardly and downwardly until they contact with the ground. Any lateral or skid movement of the automobile will now be arrested by the disks 12 and their star-plates 13. When pressure is removed from the foot lever the spring 6 will return it and the antiskid mechanism to normal or inoperative position. If preferred a foot lever of the type shown in Fig. 5 may be substituted for the foot lever 7. In Fig. 5 the bell-crank 16 is connected to the link 17 that moves through a perforation in the automobile floor and actuates the bell-cranks 5 in the manner previously described.

What is claimed is:—

In an anti-skid device for vehicles, two pair of parallel swinging rods secured to the vehicle floor, a pair of oppositely disposed bell-cranks fulcrumed to the vehicle floor, connection between each bell-crank and one rod of each pair of swinging rods, flexible connection between said bell-cranks whereby they are yieldingly retained in a predetermined position, a foot pedal for actuating said bell-cranks, a crank shaft carried by each pair of swinging rods, and a toothed disk carried by each crank shaft.

In testimony that I claim the foregoing as my own I have hereto affixed my signature in the presence of two subscribing witnesses.

JAKOB GRÖNROOS.

Witnesses:
WILLIAM HANELIUS,
E. D. BARBER.